United States Patent

Wulf et al.

[11] Patent Number: 5,921,452
[45] Date of Patent: Jul. 13, 1999

[54] DEVICE FOR PIVOTING A ROLLER FOR A MOVING WEB

[75] Inventors: Johannes Wulf, Gütersloh; Heinrich Niemann, Enger, both of Germany

[73] Assignee: Erhardt & Leimer GmbH, Augsburg, Germany

[21] Appl. No.: 08/973,668

[22] PCT Filed: Jun. 18, 1997

[86] PCT No.: PCT/EP97/03178

§ 371 Date: Dec. 23, 1997

§ 102(e) Date: Dec. 23, 1997

[87] PCT Pub. No.: WO97/48633

PCT Pub. Date: Dec. 24, 1997

[30] Foreign Application Priority Data

Jun. 20, 1996 [DE] Germany ............................ 196 24 639

[51] Int. Cl.$^6$ .................................................. B23Q 15/00
[52] U.S. Cl. ........................ 226/21; 242/413; 242/563.1
[58] Field of Search ........................... 226/18, 19, 20, 226/21, 44; 242/413, 563.1; 162/198

[56] References Cited

U.S. PATENT DOCUMENTS

| | | |
|---|---|---|
| 3,399,582 | 9/1968 | Henry . |
| 3,436,002 | 4/1969 | Racine . |
| 3,786,974 | 1/1974 | Kron .................................... 226/19 |
| 3,958,736 | 5/1976 | Pounds ................................... 226/3 |
| 4,077,579 | 3/1978 | Seleski et al. ................... 242/563.1 |
| 5,467,171 | 11/1995 | Castelli et al. . |
| 5,554,262 | 9/1996 | Turner .................................. 162/198 |
| 5,582,339 | 12/1996 | Focke et al. ........................... 226/21 |

FOREIGN PATENT DOCUMENTS

| | | |
|---|---|---|
| 1093315 | 11/1960 | Germany . |
| 2549886 | 5/1976 | Germany . |
| 2540923 | 3/1977 | Germany . |
| 4335747 | 6/1995 | Germany . |

OTHER PUBLICATIONS

Note: Ref. A is cited as being of interest in citing the art.

*Primary Examiner*—Donald P. Walsh
*Assistant Examiner*—Minh-Chau Pham
*Attorney, Agent, or Firm*—Collard & Roe, P.C.

[57] ABSTRACT

A device (5) for swinging a roll (4) for a moving web (15) consists of a shaft (6) extending through the roll (4), with provision made for gearings (7, 8) on the ends of said shaft. A servo-drive (10) engages the gearing (7), putting the shaft (6) into rotation and displacing its end (9). Gearing (8) on the counter end (12) of the roll (4) translates the rotary motion of the shaft (6) into a motion of thrust of the counter end (12) in the opposite sense, so that shaft (6) is swiveled by the single servo-drive (10) around its central point (13). Roll (4) is rotatably supported on shaft (6) and is jointly swiveled with the latter (FIG. 1).

11 Claims, 3 Drawing Sheets

DEVICE FOR PIVOTING A ROLLER FOR A MOVING WEB

The invention relates to a device for swinging a roll for a moving web, in particular a web of paper or foil, with a servo-drive engaging one end of the roll and actively connected with a mechanism transmitting the adjusting movement of said servo-drive to the opposite end of the roll in the opposite sense. Said mechanism is formed by a shaft which is rotatable by the servo-drive around its longitudinal axis, and provision is made that said mechanism is at least partly disposed in the roll.

A swinging roll for controlling an endless web is known from DE 25 40 923 A1. The two ends of the roll each are engaged by a servo-drive and the servo-drives are synchronously controlled in opposite senses. The roll is swiveled in this way around its center point, which prevents changes in the length of the web on one side. However, the employment of two servo-drives for one roll is costly and the servo-drives, furthermore, have to be synchronized with each other by additional controlling means.

Another device for swiveling a roll is known from DE 14 74 226 A1. A single servo-drive directly affects one roll end. The servodrive is transferred in an opposite sense to the counter end of the roll via angled levers and a thrust bar. In this way, due to the use of a single servo-drive, a swiveling of the roll around its middle is achieved without having to resort to expensive swiveling frames. This device, however, has the drawback that the angled levers and the thrust bar may interfere with the run of the web, so that only small looping angles of the web around the roll can be realized. Furthermore, articulated connections of the angled levers intervene in the movement of the web, so that the latter may be easily soiled by grease contained in such joints. Covering such articulated connections, however, would have the consequence that the looping angles of the web are limited even further.

A device for controlling a belt is known from DE 43 35 747 C1. This device is formed by a roll, which is supported on one side and looped by the belt. A rotatable shaft immerses in the roll and is rotatable around its longitudinal axis by a servo-drive. The shaft is actively connected with the roll via eccentric drivetrains in such a way that the rotary motion of the shaft is translated into an adjusting movement of the ends of the roll in the opposite sense along circular paths.

A device for swinging a roll is known from DE-AS 1 093 315. The ends of said roll are guided in gates each enclosing an acute angle in the direction of movement of the web. One of the ends of the roll is displaceable by a servo-drive along the gate, whereby the counter end of the roll performs; a motion approximately in the opposite direction. This known swinging device, however, has the drawback that the roll also performs an undesirable lateral movement leading to deviation of the web. Furthermore, the entire swinging device is significantly wider than the web, which leads to considerable space problems particularly in connection with web widths of 12 to 14 m as used in the manufacture of paper. In addition, the angle of swivel of the roll is limited by the gates, whereby their extension is impossible as such extension would interfere with the movement of the web.

The invention is based on the problem of creating a roll permitting swinging of the roll around its center without a swiveling frame with the use of one single servo-drive, whereby the run of the web is not obstructed by the device and the roll is maintained stable.

Said problem is solved according to the invention in that the shaft is arranged extending through the roll and coupled with a gearing translating the rotary motion into a swiveling movement of the shaft.

By the shaft extending through the roll, transmission of the adjusting movement of the servo-drive to the counter end of the roll is achieved without interfering with the movement of the web. In particular, such an arrangement results in a particularly compact structure, so that individual rolls can be arranged one after the other in a particularly close sequence. The shaft is put into rotation around its longitudinal axis by the servo-drive. In this way, the adjusting movement of the servo-drive can be transmitted to the opposite end of the roll in a particularly simple and, at the same time, exact way. Particularly the angle of swivel of the roll is in this manner not limited in any way. As compared to a motion of thrust of the roll, the rotary notion offers the special advantage that viewed in the longitudinal direction of the shaft, only very little more space is required beyond the length of the roll. This is particularly significant in connection with the long rolls of more than 10 m length usually employed in the manufacture of paper and foil materials. The gearing, for which provision is made on the counter end of the shaft, translates the rotary motion of the shaft into a motion of the roll directed in the opposite sense relative to the servo-drive. Therefore, the roll can be directly supported on the shaft without any additional gearing and is swiveled in this way around its center point, whereby provision is made only for one single servo-drive. This, furthermore, also reduces the expenditure for controlling the servo-drive. In particular, measures For synchronizing the servo-drives at both ends of the roll are dispensed with. Since the shaft is supported on the servo-drive, on the one side, and on the gearing on the other side, a stable structure is obtained, preventing swing movements of the roll.

A toothed-gear drive is usefully employed as gearing. Such a gearing is particularly low in friction, yet permits transmission of high setting forces in order to allow rapid swinging of the roll.

It is favorable to couple the shaft with the servo-drive via a gearing. It is easily possible with such a gearing to realize the high adjusting forces required for swinging the roll and, at the same time, the low lifts of adjustment as obtained with conventional servo-drives such as, for example electric motors or hydraulic drives. Especially if a swingable roll is employers for controlling the movement of the web, high setting forces are of decisive importance for achieving short control times. The use of toothed-gear drives is advantageous for realizing adequate gear reduction especially in connection with electric motors operating at high speeds.

It is proposed to torsionally rigidly connect the end of the shaft with a gear engaged by the servo-drive. Nonpositive and low-friction coupling is realized in this way between the servo-drive and the shaft.

The servo-drive preferably engages the gear connected with the shaft via a rotatably supported threaded spindle. Relatively high reduction of the servo-drive can be realized in this way with just a few means. The stationary threaded spindle or toothed rack, for which provision is made on the opposite side of the gear, forms an abutment for the gear on which the latter rolls off as it is being rotated by the servo-drive. As a consequence of such rotation, the gear is displaced along the threaded spindle, so that the shaft connected with the latter is swiveled. A motion of swivel of the shaft is produced in this surprisingly simple manner and can be used for swinging the shaft. The gear preferably has an involute toothing, so that it rolls off on the threaded spindles or on the toothed rack without sliding. This reduces the occurring frictional forces and thus the time required for carrying out an adjusting movement of the shaft.

A gear connected with torsional strength with the shaft was found to be successfully useful for the gearing engaging the counter end of the shaft, such gear mating with a stationary threaded spindle or toothed rack. The stationary threaded spindles or toothed racks on both ends of the shaft oppose each other diagonally. This surprisingly simple arrangement results in a reliably working coupling of the movements of both ends of the shaft in opposite senses, so that during the movement of adjustment of the servo-drive, the shaft is swiveled around its central point. In the present case, the motion of swivel of the shaft can be directly exploited for swinging the roll.

It is advantageous for said purpose if the roll is rotatably supported on the shaft. This assures that the shaft always extends centrally through the roll, so that the motion of swivel of the shaft is directly transmitted to the roll, This measure, moreover, offers the advantage that the motion of swivel of the roll is not limited by the shaft. The present swirling device consequently can be employed also with rolls having a small outside diameter.

In order to avoid uncontrolled motions of swivel of the shaft about axes of swivel other than the predetermined axis of swinging, it is favorable if the shaft is supported on a gate-like coulisse via an antifriction bearing, such gate preferably extending parallel with the threaded spindles or toothed racks. This has the added advantage that the spacing between the axle of the gear and the threaded spindles or toothed racks is kept constant, which in turn prevents canting of the teeth.

It is advantageous if the device is used for controlling the movement of the web. Particularly the space requirement in the production line will be minor owing to the compact structure of the device, so that such device for controlling the movement of a web can he installed in an existing production line at a later time as well. Especially with paper machines, the special advantage obtained within the wet section is that no one-sided change in the length of the web is caused by swinging the roll controlling the movement of the web. Such change would significantly interfere with the further production process downstream. The axis of swivel of the roll controlling the movement of the web preferably extends perpendicular to the plane of angular symmetry between the web running up to the roll and the web running off the latter, so that the change in tensional force acting on the web is particularly low. Alternatively, however, the axis of swivel may be selected also in such a way that it extends parallel with the web running up to the roll, which results in a maximal guiding effect of the roll controlling the movement of the web.

Alternatively, it is advantageous if the device is employed for correcting a difference in the tensional force between the two halves of the web. In this case, the axis of swivel is preferably placed parallel with the plane of angular symmetry between the web running up and the web running off, or in the direction of the web running up.

Particularly in connection with sensative webs such as in the wet section of a paper machine, it is favorable if a roll compensating the tensional force is arranged downstream of the roll controlling the movement of the web, and if the swinging device is employed for both rolls. The roll compensating the tensional force can compensate in this connection the changes in tensional force in the web caused by the roll controlling the run of the web. Due to the compact structure of the swinging devices of both rolls, said rolls may be arranged in a very close sequence, so that changes in length between the two edges of the web are avoided. Alternatively, the roll compensating the tensional force may be designed also in the form of a self-adjusting roll. In this case, the servo-drive and the rotatable threaded spindle are omitted with the swinging device of the roll compensating the tensional force. The latter is in this case swiveled only by the force of the web.

Additional advantages and features of the present invention are explained in the following detailed description with the help of the associated figures, which contain a number of exemplified examples of the present invention. However, it should be noted that the drawing only serves the purpose of illustrating the invention and does not limit the scope of protection of the invention.

In the drawing, identical reference numerals always denote identical parts. In the drawing, FIG. 1 is a perspective view of a device for controlling the movement of a web, with a device for swinging a roll.

Figure 1:
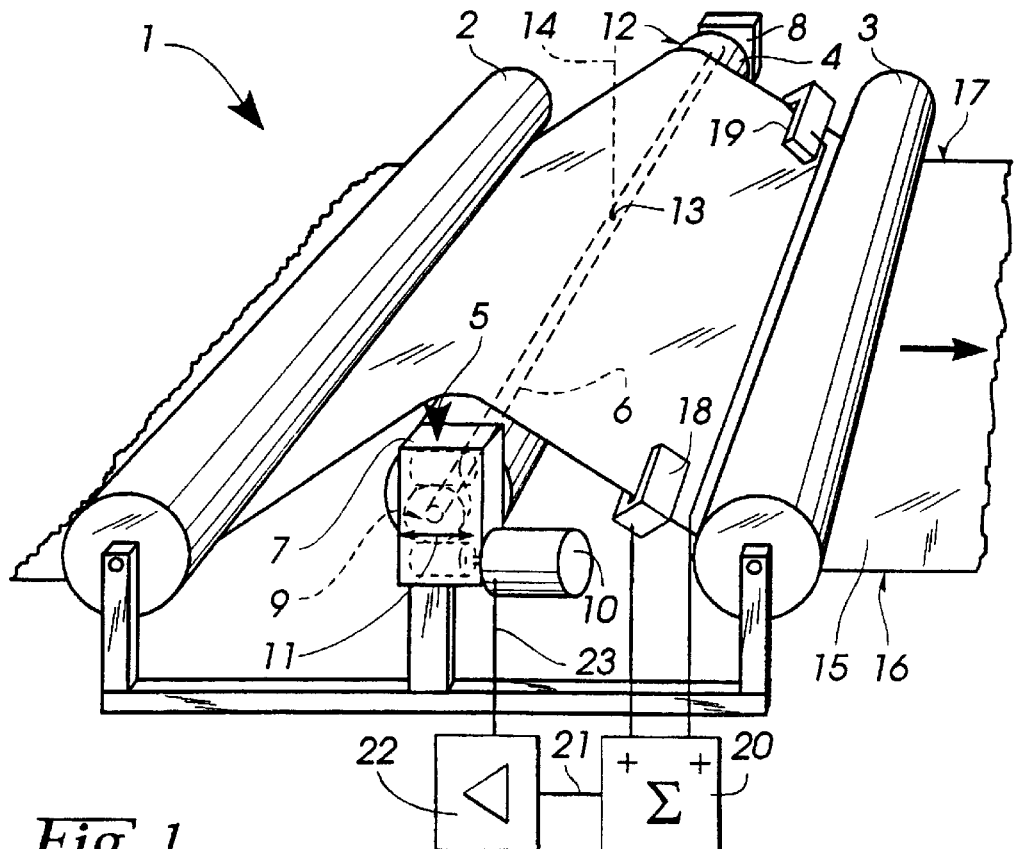

FIG. 1 shows a perspective view of a device 1 for controlling the movement of a web, consisting of two rotatably supported rolls 2, 3, and a rotably supported rotatable roll 4 arranged between said two rolls. For swinging roll 4, provision is made for a device 5, which is formed by a shaft 6 extending through the roll, and two gearings 7, 8. A servo-drive 10 is coupled with the gearing 7 engaging end 9 of shaft 6. Said servo-drive 10 puts shaft 6 into rotation, whereby end 9 of said shaft is displaced in the direction of double arrow 11. Gearing 8, for which provision is made on counter end 12 of shaft 6, translates the rotary motion of shaft 6 into a motion of counter end 12 in the opposite sense. In this way, servo-drive 10 swivels shaft 6 around a axis of swivel 14 extending through its central point 13. Roll 4 is supported on shaft 6 via antifriction bearings not shown, so that the movement of swivel performed by shaft 6 is transmitted to roll 4.

Rolls 2, 3, 4 are looped by a web 15; edges 16, 17 of said web are scanned by edge sensors 18, 19. The output signals of edge sensors 18, 19 are supplied to an adder 20, which computes the course of the center of the web based on said signals. Adder 20 is connected via a signal path 21 with a controller 22, which preferably has a P-, PI- or PID-behavior. Controller 22 compares the course of the center of the web with a should-be value, The correction signal computed by controller 22 controls via a signal path 23 servo-drive 10 of swinging device 5, which corrects the movement of the web by swiveling roll 4.

Figure 2:
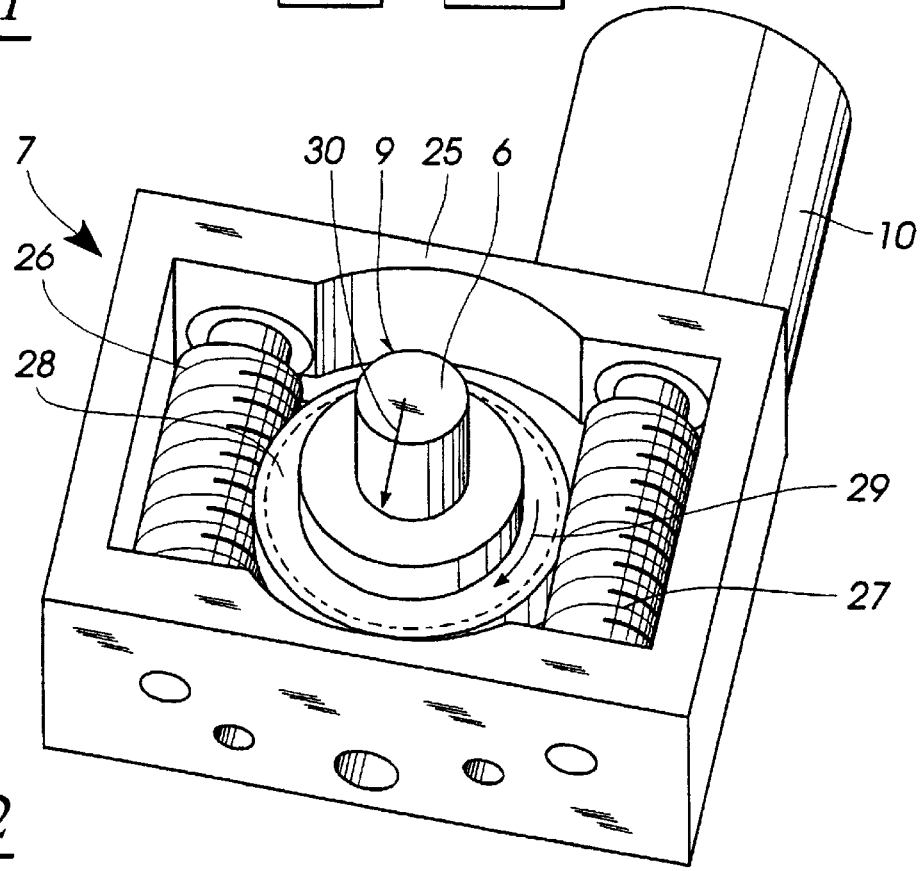
FIG. 2 shows a gearing of the swinging device of the side of the servo-drive.
Figure 3:
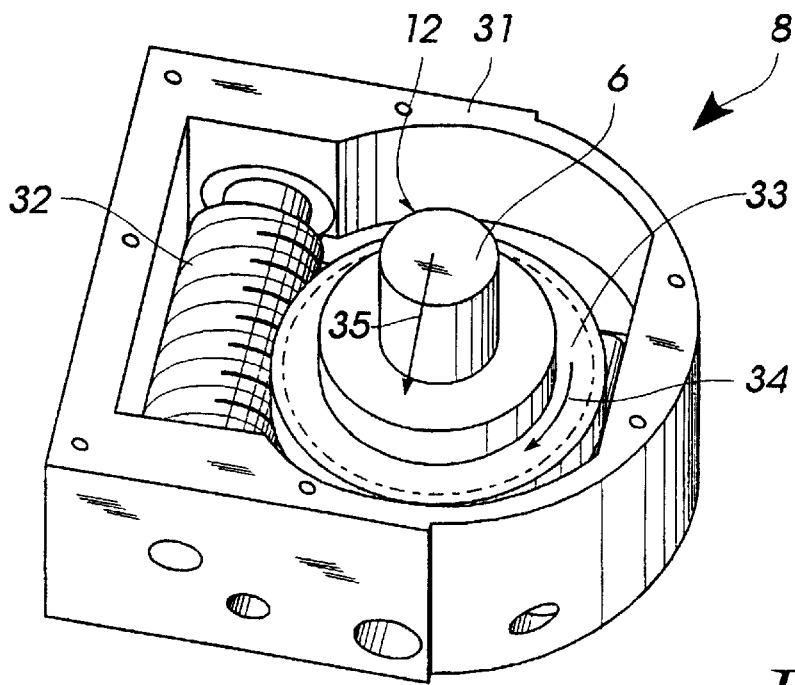
FIG. 3 shows a gearing of the swinging device, for which provision is made on the opposite end of the roll.
Figure 4:
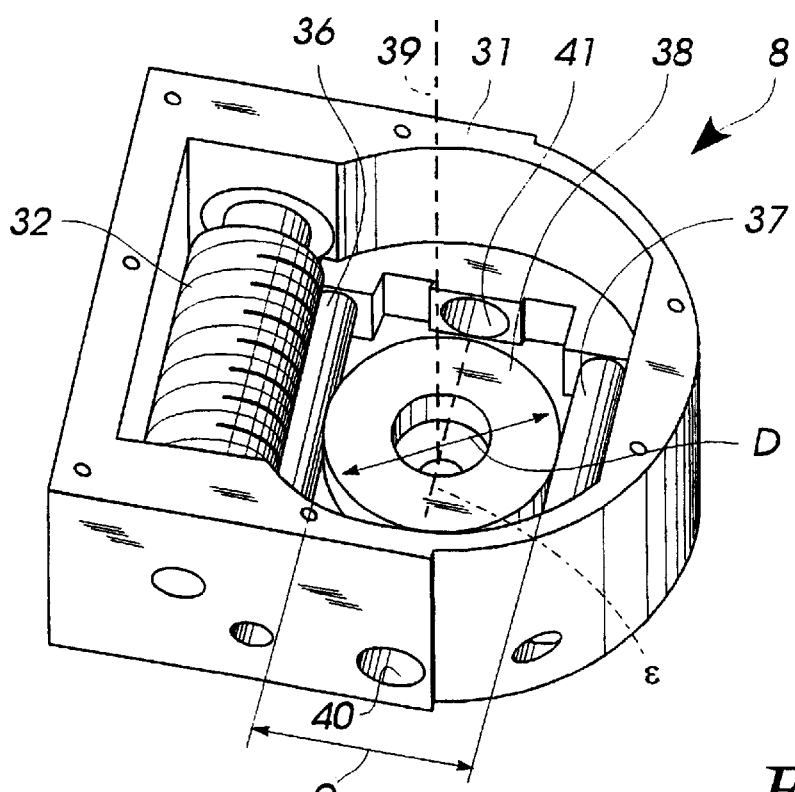
FIG. 4 shows the gearing according to FIG. 3 without a toothed gear and without a shaft.

The structure and the function of gearings 7, 8 are explained in greater detail with the help of FIGS. 2 to 4. According to FIG. 2, gearing 7 consists of a housing block 25, on which servo-drive 10 is flanged. In housing block 25, provision is made for two threaded spindles 26, 27, whereby threaded spindle 26 is stationary and threaded spindle 27 can be put into rotation by servo-drive 10. Threaded spindles 26, 27 mate with a toothed gear 28, which is torsionally rigidly connected with shaft 6. When servo-drive 10 rotates threaded spindle 27, for example anticlockwise, toothed gear 28 is rotated in the direction of arrow 29. Since toothed gear 28 mates with threaded spindle 26 on the side opposing threaded spindle 27, it has to roll off on spindle 26. This leads to a displacement of toothed gear 28 and thus of shaft end 9 in the direction of arrow 30. Gearing 7 consequently provides for a rotation caused by servo-drive 10 and at the same time for a displacement of shaft end 9.

FIG. 3 shows that provision is made for a gearing 8 on counter end 12 of shaft 6. Said gearing too consists of a housing block 31, in which provision is made for a stationary threaded spindle 32. Said threaded spindle 32 mates with a toothed year 33, which is torsionally rigidly connected with shaft 6. When shaft 6 with toothed gear 33 is rotating, for example in the direction of arrow 34, counter end 12 of the shaft is displaced in the direction of arrow 35. In this way, the rotary motion of shaft 6 caused by gearing 7 according to FIG. 2 is translated by gearing 8 into a thrust motion of counter end 12 of shaft 6. The two gearings 7, 8 are arranged relative to each other in such a way that the stationary threaded spindles 26, 32 oppose each other diagonally, the consequence being that the motions of the two ends 9, 12 of shaft 6 are coupled relative to each other in opposite senses.

FIG. 4 shows gearing 8 according to FIG. 3, whereby toothed gear 33 with shaft 6 is removed so that the parts disposed underneath can be seen. Two columns 36, 37 are mounted fixed in housing block 31 with a spacing "e", said columns forming a gate guide for shaft 6. Shaft 6 has an antifriction bearing 38 operating between columns 36 and 37. In this connection, the spacing "e" between the columns is slightly larger than the outside diameter "D" of antifriction bearing 38. In this way, antifriction bearing 38 rests only against one of the two columns 36, 37 and rolls off on such column without sliding. The effect of the gate guide is that shaft 6 can move only within a plane ϵ. This assures that an axis 39 of shaft 6 is always spaced from threaded spindle 32 with the same distance, so that the toothings of threaded spindle 32 and toothed gear 33 correctly engage each other. This is important so that the teeth of toothed gear 33 roll of on threaded spindle 32 without sliding.

In housing block 31, provision is made in the plane of movement of antifriction bearing 38 for through-extending bores 40, 41, on which provision is made for stops (not shown) for limiting the path of adjustment of shaft 6 on both sides. In addition, provision could be made in one of the through-extending bores 40, 41 for a shock absorber for dampening the vibrations of shaft 6.

The gate support of shaft 6 in gearing 8 is present in the same way in gearing 7 according to FIG. 2 as well. Even though displacement of toothed gear 28 perpendicular to threaded spindles 26, 27 is already prevented due to the engagement of said threaded spindles 26, 27 from both sides of toothed gear 28, the gate guide in said gearing 7 prevents an increase in the friction of the teeth due to minor variations in the spacing of shaft 6 from threaded spindles 26, 27.

Figure 5:
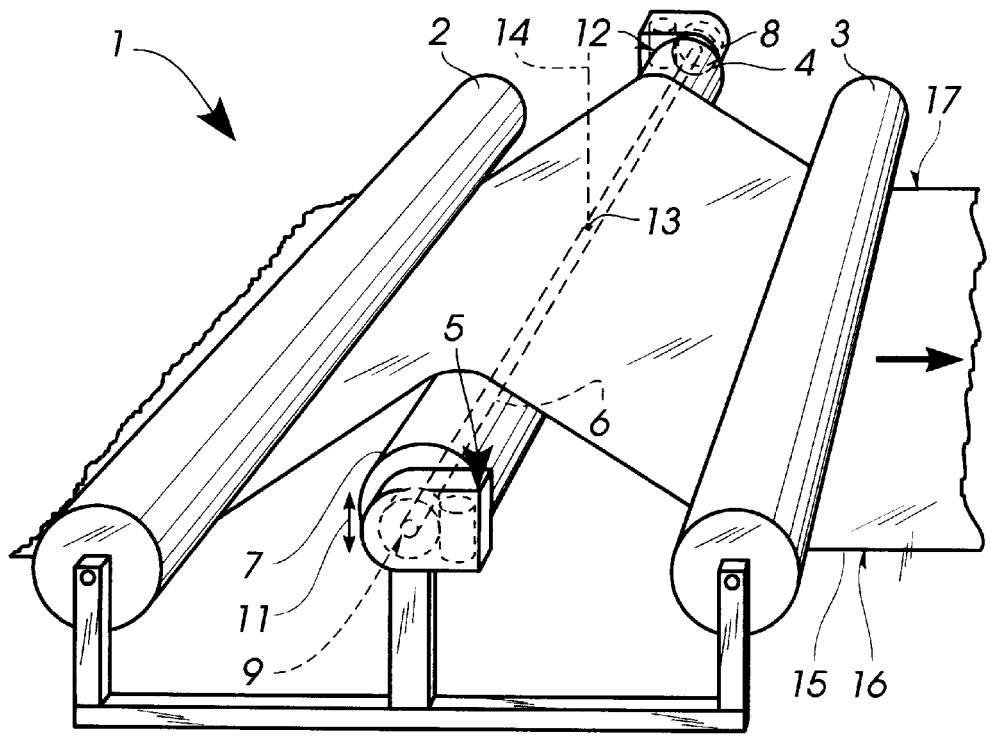
FIG. 5 shows an alternative embodiment of the device according to the invention.
Figure 6:
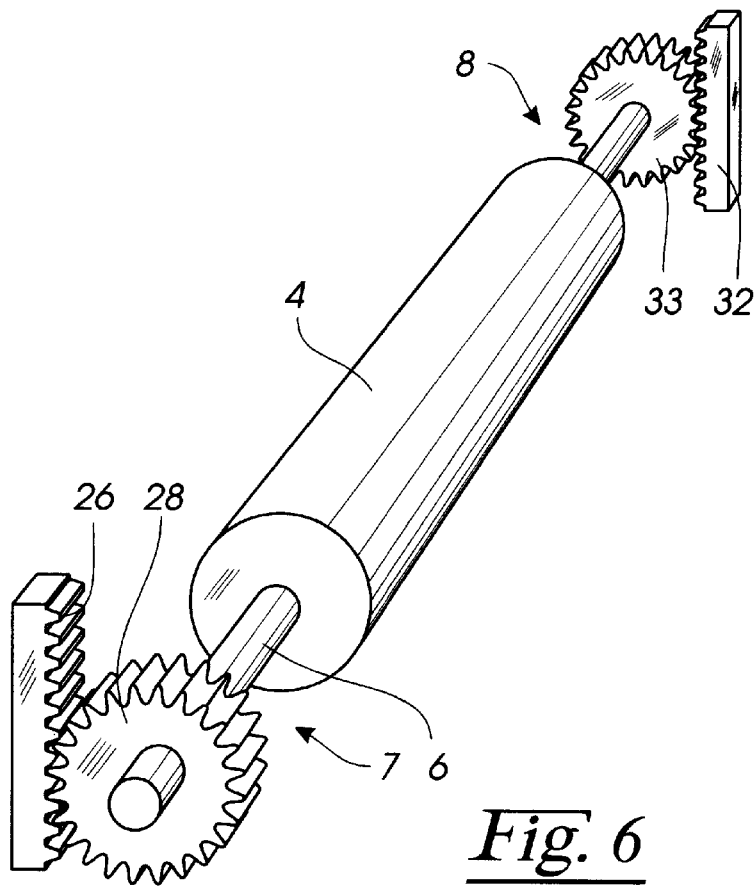
FIG. 6 shows an enlarged view of the roller shown in FIG. 5.

FIGS. 5 and 6 show an alternative embodiment of the invention in which the roll compensating the tensional force is designed in the form of a self-adjusting roll. In this case, the servo-drive and rotatable threaded spindle are omitted, and the swinging device of the roll compensates the tensional forces. The roll in this case is swivelled only by the force of the web.

Due to the fact that a few exemplified examples of the present invention are not shown or described, it is to be understood that many changes and modifications of the described exemplified examples are possible without departing from the essential idea and the scope of protection of the invention as defined by the claims.

LIST OF REFERENCE NUMERALS

1 Device for controlling the movement of a web
2, 3 Roll
4 Swinging roll
5 Device
6 Shaft
7, 8 Gearing
9 End
10 Servo-drive
11 Double arrow
12 Counter end
13 Central point
14 Axis of swivel
15 Web
16, 17 Edge
18, 19 Edge sensor
20 Adder
21 Signal path
22 Controller
23 Signal path
25 Housing block
26, 27 Threaded spindle
28 Toothed gear
29, 30 Arrow
31 Housing block
32 Threaded spindle
33 Toothed gear
34, 35 Arrow
36, 37 Column
38 Antifriction bearing
39 Axis
40, 41 Through-extending bore

We claim:

1. A device for swinging a roll penetrated by a shaft and supported on the latter, for a moving web, in particular a web of paper or foil, with a servo-drive engaging one end of the roll and adjusting both ends of the shaft in the opposite sense, characterized in that the shaft is rotatable by the servo-drive around its longitudinal axis and held at its ends in gearing translating the rotary motion into a motion of swivel of the shaft.

2. The device according to claim 1, characterized in that the gearing (8) is a toothed-gear drive.

3. The device according to claim 1, characterized in that the shaft (6) is coupled with the servo-drive (10) via a gearing (7), preferably a toothed-gear drive.

4. The device according to at claim 1 characterized in that within the range of its end (9), the shaft (6) is torsionally rigidly connected with a toothed gear (28), said gear being engaged by the servo-drive (10).

5. The device according to claim 4, characterized in that the toothed gear (28) mates with a stationary threaded spindle on one side and with a threaded spindle (27) coupled with the servo-drive 10 on the opposing side of the toothed gear.

6. The device according to claim 1, characterized in that the gearing (8) engaging the counter end (12) of the roll is formed by a toothed gear (33) torsionally rigidly connected with the shaft (6), said toothed gear mating with a stationary threaded spindle (32) or toothed rack disposed diagonally opposite the stationary threaded spindle (26) or toothed rack provided on roll end (9).

7. The device according to claims 1, characterized in that the shaft (6) has at least one antifriction bearing (38) supported on a gate (36, 37).

8. The use of the device according of claim 1 for correcting a lateral course of the web by detecting and controlling the edge (16, 17) of the web, whereby the control acts upon the servo-drive (10) engaging the end of the roll (9).

9. The use of the device according to claim 1 for correcting a difference in the tensional force between both web halves by detecting and controlling the difference in the tensional force, whereby the control acts upon the servo-drive engaging the end of the roll.

10. Use of the device according to claim 1, comprising two rolls arranged one after the other for correcting the lateral course of the web and the difference in tensional force of both halves of the web by swiveling the roll controlling the movement of the web by detecting and controlling the edge of the web by acting upon the servo-drive of the roll controlling the movement of the web, and by detecting and controlling the difference in tensional force by acting upon the servo-drive of the roll compensating the tensional force.

11. The use of the device according to claim 1, comprising two rolls arranged one after the other for correcting the lateral movement of the web and the difference in tensional force of the two halves of the web caused by swinging of the roll controlling the movement of the web, and by detecting and controlling the edge of the web by acting upon the servo-drive of the roll controlling the movement of the web, and by swinging the roll compensating the tensional force by the force of the web.

* * * * *